(12) United States Patent
Jotcham

(10) Patent No.: US 6,616,190 B1
(45) Date of Patent: Sep. 9, 2003

(54) SECURITY ELEMENTS

(75) Inventor: Richard Bryan Jotcham, Trowbridge (GB)

(73) Assignee: De la Rue International Limited, Basingstoke (GB)

( * ) Notice: Subject to any disclaimer, the term of this patent is extended or adjusted under 35 U.S.C. 154(b) by 0 days.

(21) Appl. No.: 09/914,792

(22) PCT Filed: Mar. 10, 2000

(86) PCT No.: PCT/GB00/00907

§ 371 (c)(1),
(2), (4) Date: Sep. 5, 2001

(87) PCT Pub. No.: WO00/54985

PCT Pub. Date: Sep. 21, 2000

(30) Foreign Application Priority Data

Mar. 12, 1999 (GB) .............................................. 9905787

(51) Int. Cl.⁷ ............................................. B42D 15/00
(52) U.S. Cl. ......................... 283/91; 283/109; 283/72; 283/113; 428/195
(58) Field of Search ............................ 283/72, 82, 83, 283/85, 91, 92, 93, 113, 114, 901, 109, 107; 428/195

(56) References Cited

U.S. PATENT DOCUMENTS 4,505,498 A  3/1985  Weinberger
5,465,301 A * 11/1995 Jotcham et al. ................ 283/85
5,834,096 A * 11/1998 Waitts ......................... 428/195

FOREIGN PATENT DOCUMENTS

| DE | 2842972 | 3/1980 |
|----|---------|--------|
| DE | 4243905 | 6/1994 |
| GB | 2201376 | 9/1988 |
| WO | 9734170 | 9/1997 |

* cited by examiner

Primary Examiner—Willmon Fridie, Jr.
(74) Attorney, Agent, or Firm—Dykema Gossett PLLC

(57) ABSTRACT

The invention is concerned with security elements for security articles such as banknotes, cheques and the like.

The invention further comprises a security element for use with security materials, said element comprising a first layer, to one side of which is applied at least one optically variable device, and on the other side of said first layer are applied indicia, and a thermochromic coating applied over the indicia, wherein the thermochromic coating comprises a thermochromic material which is coloured when the temperature of said thermochromic coating is below an activation temperature, which colour substantially obscures the indicia and enhances the visibility of the optically variable device, and wherein the thermochromic material becomes colourless at or above said activation temperature, to thereby reveal the indicia, and to render the optically variable device substantially invisible in reflected light.

27 Claims, 2 Drawing Sheets

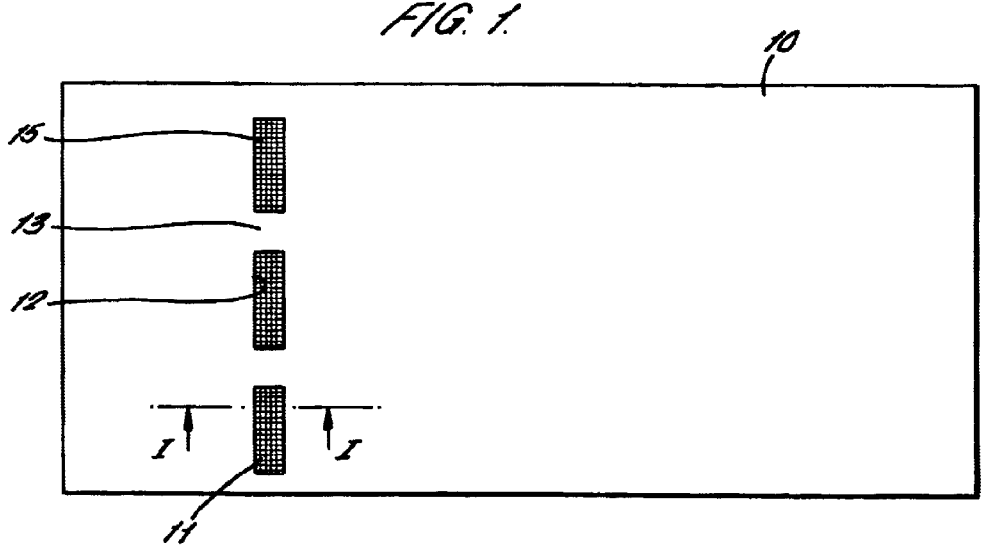
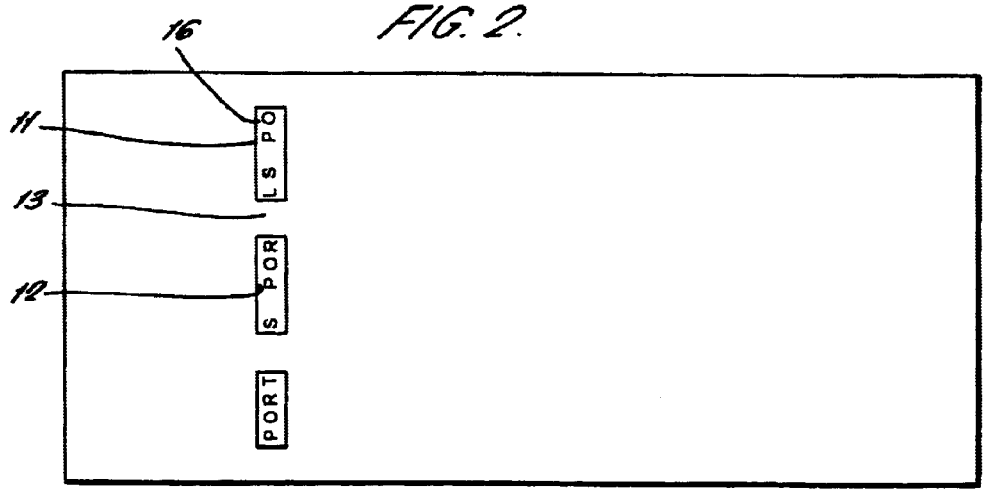

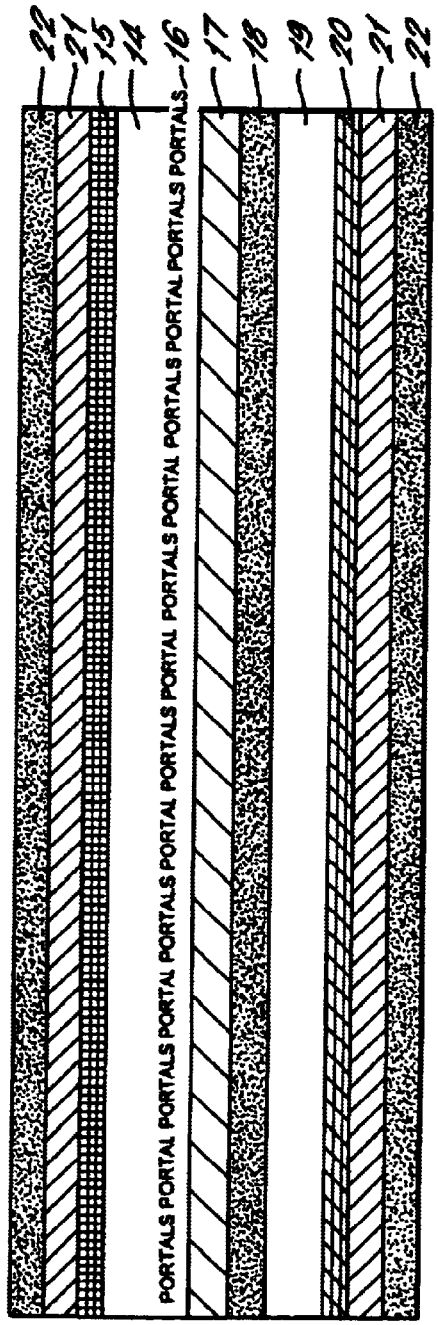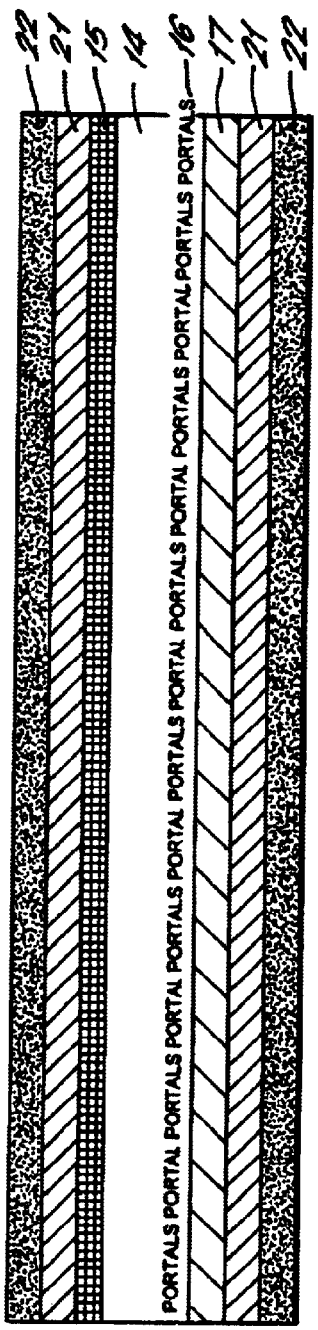

SECURITY ELEMENTS

BACKGROUND OF THE INVENTION

1. Field of the Invention

The invention is concerned with security elements for security articles such as banknotes, cheques and the like.

2. The Prior Art

Holograms are widely used as security features in credit cards as they cannot be reproduced by photographic or photocopying techniques. To enhance the security of holograms and to prevent contact copies being made, a technique was developed for making holograms by a process of demetalization. Demetalized holograms and patches are used in passports and ID cards to protect photographs and data. The image beneath the hologram is only visible when the document is tilted. Such holograms therefore provide very useful surface security features and can be more easily used in applications where the substrate to which they are applied is flexible or foldable such as in banknotes.

It is also widely known to use in banknotes security elements in the form of strips or threads which are made from a transparent film provided with a continuous reflective metal layer, vacuum deposited aluminium on polyester film being the commonest example. Banknotes made using such security devices have been in general circulation in many countries for many years. When such security elements are embedded in security paper and the paper is subsequently printed to provide the security document, e.g. a banknote, the thread cannot readily discerned in reflected light but is immediately apparent as a dark image when the document is viewed in transmitted light. Such threads are extremely effective against counterfeiting by printing or photocopying, since the optically variable effect which is provided cannot be accurately simulated, for example by printing a line on the paper.

The composition, size and positioning of security threads currently in use vary depending on the desired security of the document. Typical security threads are composed of a polymeric film such as polyester, which may be metallised or coloured and may include microprinted lettering denoting a title or message. The lettering can be produced by printing onto the substrate or by de-metallising a metallic layer on the substrate. One example of a microprinted thread can be found in GB-A-1095286. The threads can be slit to produce either registered lettering with respect to the edge of the thread, or unregistered lettering designed so that the message always appears irrespective of thread slitting. The widths of threads typically used vary from 0.5 mm to 2 mm and may have thicknesses typically ranging from 12 micrometers up to 50 micrometers.

The positioning of the thread within the document may be strictly controlled to agreed criteria and may be concurrent with additional security features, such as a watermark. Security threads may be fully embedded within security paper in such a way that paper fibres cover both sides of the thread, making it considerably less visible in reflective light, but clearly visible in transmitted light.

In recent times, however, in order to enhance security documents against modern counterfeiting techniques making use of sophisticated colour separation, printing and colour photocopy technology, it has become common to use a security thread comprising a thin layer of aluminium on a plastic support which is exposed on one side of the sheet at intervals along the length of the thread, the region of exposure being referred to as a window. GB-A-1552853 and GB-A-1604463 disclose banknotes containing such windows. Paper for use in producing such banknotes can be made using the method disclosed in EP-A-0059056. The dimensions of the windows typically used are from 3 mm to 14 mm lengthways, with bridges ranging from 4 mm to 30 mm there between. Again, the positioning of the windows may be controlled to allow registration of the window with respect of the document and other security features such as watermarks.

This latter development has resulted in enhanced security, and windowed paper has been used for banknotes in many countries. A banknote of this type provides added security against counterfeiters as, when viewed in transmitted light, the strip is seen as a dark line and when viewed in reflected light on the appropriate side, the bright shining aluminium portions which are exposed at the windows are readily visible. However, there is a need for even greater security by the use of more sophisticated security devices in order to render the task of a would-be counterfeiter more difficult as the reflected light appearance of the exposed aluminium portions of a security device can be simulated to a degree by modern materials and techniques, for example, by the use of hot foil stamping.

Other threads in use are coated with protective lacquers and these may contain, for example, fluorescent inks which are only visible on illumination with ultra violet light of a specific wavelength, e.g. 366 nm.

It is also possible to make threads that are machine readable by incorporating into or onto the substrate, substances which can be identified by a detector, such as magnetic material.

Other known threads can be a single layer or multiple layers bonded or laminated together, and in some instances each layer may be coated with metal such as aluminium, stainless steel, tin and/or metal oxide such as tin oxide. The coating may be protected with a lacquer which may also contain coloured or invisible fluorescent pigment, for example, rare earth chelates, such as europium acetylacetonate and the like.

Another prior art solution to enhancing the security of a security article such as banknotes is described in DE-B-1228972. This utilises a thermochromic compound applied in the form of a picture or other marking to paper such as a banknote such that when it is warmed the previously invisible picture or marking is revealed. This effect is reversible such that the picture or marking disappears when the banknote is cooled.

EP-A-0243285 also describes security paper which has a thermochromic coating. The paper is authenticated by applying heat which results in a change in the colour of the paper itself. EP-A-0400220 describes a laminated article having two layers, of which one is transparent and between which is a layer carrying or containing thermochromic liquid crystals in the form of a pattern which can be made visible or obtains a change in colour on a heat change.

In EP-A-0608078 there is described an improved security thread for use in security articles which has a thermochromic coating on one or both sides of the thread. The coating comprises a material selected from pigments and dyestuffs and the coating overlays indicia on the substrate such that when the thermochromic material is heated to its activation temperature, the coloured coating turns clear to reveal the indicia (or vice versa).

The present invention is concerned with providing a further improvement to this type of security thread by increasing the number of security features utilised.

SUMMARY OF THE INVENTION

The invention therefore provides a security element for use in security articles, said element comprising a first layer, to one side of which is applied an optically variable device, and on the other side of said first layer is applied indicia, and thermochromic coating applied over the indicia, wherein the thermochromic coating comprises a thermochromic material which is coloured when a temperature of said thermochromic coating is below an activation temperature, which colour obscures the indicia and enhances the visibility of the optically variable device, and wherein the thermochromic material becomes colourless at or above said activation temperature to thereby reveal the indicia, and to render the optically variable device substantially invisible in reflected light.

The present invention also provides a security element for use in security articles said element comprising a first transparent layer, to one side of which is applied an optically variable device and on the other side of said first layer are applied indicia, and a thermochromic coating applied over the indicia, wherein the thermochromic coating comprises a thermochromic material which is colourless when the temperature of said thermochromic coating is below an activation temperature, which will thereby reveal the indicia and render the optically variable device substantially invisible in reflective light, and wherein the thermochromic material becomes coloured above said activation temperature, which colour substantially obscured the indicia and enhances the visibility of the optically variable device.

The invention will now be described, by way of example only, with reference to the accompanying drawings.

BRIEF DESCRIPTION OF THE DRAWINGS

FIG. 1 is a plan view of a sheet of security paper containing a security thread according to the invention viewed in reflected light at a temperature below the activation temperature;

FIG. 2 is a plan view of the security paper of FIG. 1 viewed in reflected light at a temperature greater than the activation temperature;

FIG. 3 is a cross-sectional end elevation of the security thread illustrated in FIG. 1 taken on the line I—I; and FIG. 4 is a cross-sectional end elevation of a second embodiment of security thread according to the present invention.

DETAILED DESCRIPTION OF THE PREFERRED EMBODIMENTS

Referring to FIG. 1, there is shown a security article made from a security material comprising a substrate 10, which may be a sheet of security paper or card made from synthetic fibres, natural fibres, a combination of synthetic and natural fibres, or plastic.

In one application of the present invention, a security element in the form of an elongate security thread 11 is embedded partially within a paper substrate 10. This may be achieved by one of a number of known processes. The thread 11 can be partially embedded using a cylinder mould machine as described in EP-A-0059056 to produce a defined format of windows 12 in which the thread 11 is visible on one or both sides of the sheet 10, and separated by bridges 13, in which regions the thread 11 is wholly embedded.

In alternative applications of the present invention, the thread 11 may be adhered to the surface of the substrate 10 which again can be paper, plastic or card to form a security article in which the thread 11 is wholly exposed. This thread 11 could be hot stamped or rolled on to the surface.

The security element 11, whether in thread or another form such as described below, comprises a first layer 14, preferably of a polymeric film such as polyester, e.g. MYLAR(TM) from DuPont or MELINEX(TM) from ICI. Applied to one side of the first layer 14 is an optically variable device 15 (e.g. a hologram) which produces an image of some description. On the other side of the first layer 14 are printed indicia 16, e.g. in the form of the message PORTALS as shown in FIG. 2, or other text, numerical data, graphics or some other form of identifying sign(s). The indicia 16 may be applied by a number of different techniques using, for example, a roll coater or a printing press involving flexographic, offset lithographic or gravure techniques. The indicia 16 may be printed with ink which fluoresces under ultraviolet light to produce a fluorescent feature, or alternatively the substrate may include a UV fluorescent dye either in the substrate, on the surface thereof or in a coating on its surface.

A magnetic feature may alternatively be incorporated by utilising a magnetic ink for the indicia 16.

The first layer 14 is subsequently coated over the indicia-bearing side with a formulation containing a thermochromic pigment to provide a thermochromic coating 17. In one embodiment of the invention the thermochromic formulation is selected such that the coating 17 is coloured when inactivated, but becomes colourless on warming to its activation temperature. The activation temperature will depend on the pigment being used. Many pigments have activation temperatures of 35° C., but this is not true for all compounds. This coating 17 may be applied by any appropriate technique such as roll coating, flexographic, offset lithographic or gravure printing.

In an alternative embodiment of the invention, a thermochromic coating 17 may be used which has no colour at ambient temperature, but becomes coloured at its activation temperature to obscure indicia 16 previously legible.

In a further embodiment, the formulation of the coating 17 may comprise a plurality of thermochromic pigments having different colours and activated at different temperatures.

After the coating 17 of thermochromic formulation has dried, a layer of adhesive 18 is applied and the first layer, together with its coating 17, is laminated to a second layer 19. Optionally a further optically variable device 20 is applied to the remaining exposed surface of the second layer 19. The second optically variable device 20 will preferably be applied to the second layer 19 before the first 14 and second 19 layers are laminated together.

To protect the optically variable device(s) 15, 20, one or two layers of a protective hardcoat 21 can be applied. Layers of adhesive 22 may also be applied to the external surfaces of the protective hardcoat layers 21, depending on the mode of application of the security element. If the element is being applied to the surface of the substrate 10, only one layer of adhesive will be required.

Thus, when the security article 10 of FIG. 1 is viewed in reflected light at a temperature below the activation temperature of the thermochromic coating 17, the image provided by optically variable device 15 will be visible with the colour of the thermochromic compound showing through clear regions within the image. The indicia 12 are obscured by the colour of the coating 17 in this state.

When the thermochromic coating 17 of the security element 11 is warmed to its activation temperature or above, it becomes colourless. The indicia 16, which were previously obscured by the colour of the inactive pigment, now becomes clearly visible in reflected light as shown in FIG. 2. Simultaneously, as the coloured layer behind the optically variable device 15 becomes transparent the image produced by the optically variable device 15 substantially disappears.

The visibility of the optically variable device 15 is dependent on the depth of colour behind it. Thus when the thermochronic coating 17 is inactive and highly coloured, then the optically variable device 17 is clearly visible at oblique angles. When the thermochromic coating 17 is activated, it becomes colourless and consequently the visibility of the optically variable device diminishes markedly. At this point the indicia 16 are visible, unhampered by the overlying optically variable device 15.

However, traces of the optically variable device 15 may be partially visible in the regions of the printed indicia 16.

As well as the double sided embodiment of the security element illustrated in FIG. 3, a single sided version, as shown in FIG. 4, may be used. The double sided version has the advantage that, if during insertion of the thread 11 into the paper the thread flips, it will make little or no difference to the end product.

In alternative embodiments of the invention the indicia 16 may be provided by known metallisation or demetallisation techniques.

Instead of applying the security element in the form of an elongated thread 11, it could be applied to the security article as a self adhesive patch or label to the product for protection. In such an embodiment of the invention, the bond between the thermochromic coating 17 and first layer 14 may be designed to be weaker than the bond between the adhesive 22 and substrate 10 so that attempts to remove the patch or label cause clear visible disruptional damage to the thermochromic coating 17 and print 16.

An optically variable ink, such as OVI(TM) of Sicpa SA, may be used as the optically variable device(s) 15, 20. The ink may be printed as a pattern, for example. Such inks consist of opaque micro-flakes added to a transparent ink medium. The colour of the OVI is derived from interference effects due to the reflection from the tiny opaque micro-flakes. The colour changes with the angle of observation.

Demetalized holograms may alternatively be used as the optically variable device(s) 15, 20. Such holograms are created and coated with aluminium so that they become reflective. A coating of varnish is selectively printed on the metal. When the varnish is dry, a caustic wash is used to remove the metal in the places not covered by the varnish. After washing and drying, the hologram shows a reduced reflectivity due to the amount of removed metal, but also exhibits a see-through characteristic. Thus when applied to the security element 11 of the present invention, the thermochromic layer 17 can be seen behind the remaining holographic image.

In yet another form, the security element could be converted into a tear tape for packaging. Typically such tear tapes require an adhesive layer to be applied to any elongate security thread, which is then adhered to the packaging. Removal of the tear tape causes the packaging also to tear, thereby facilitating its opening.

What is claimed is:

1. A security element for use with security materials, said element comprising a first transparent layer, to one side of which is applied at least one optically variable device, and on the other side of said first layer are applied indicia, and a thermochromic coating applied over the indicia, wherein the thermochromic coating comprises a thermochromic material which is coloured when the temperature of said thermochromic coating is below an activation temperature, which colour substantially obscures the indicia and enhances the visibility of the optically variable device, and wherein the thermochromic material becomes colourless at or above said activation temperature, to thereby reveal the indicia, and to render the optically variable device substantially invisible in reflected light.

2. A security element for use in security articles said element comprising a first transparent layer, to one side of which is applied an optically variable device and on the other side of said first layer are applied indicia, and a thermochromic coating applied over the indicia, wherein the thermochromic coating comprises a thermochromic material which is colourless when the temperature of said thermochromic coating is below an activation temperature, which will thereby reveal the indicia and render the optically variable device substantially invisible in reflective light, and wherein the thermochromic material becomes coloured above said activation temperature, which colour substantially obscures the indicia and enhances the visibility of the optically variable device.

3. A security element as claimed in claim 1 further comprising a second layer adhered to the thermochromic coating and having at least one further optically variable device applied to the surface thereof.

4. A security element as claimed in claim 1 further comprising a protective layer over the optically variable device or devices.

5. A security element as claimed in claim 1 in which the thermochromic coating is composed of a variety of thermochromic compounds which display differing colours, which compounds are activated at different temperatures, such that, as the element is warmed or subsequently cooled, it progresses through a pattern of changing colours.

6. A security element as claimed in claim 1 further including a fluorescent dye or material either contained in the first layer, printed on the surface of the first layers or contained in a coating on the surface of the first layer.

7. A security element as claimed in claim 1 in which the indicia incorporates a fluorescent dye or material.

8. A security element as claimed in claim 1 in which the indicia are printed using a coloured ink.

9. A security element as claimed in claim 1 in which the indicia are printed using a magnetic ink.

10. A security element as claimed in claim 1 in which the indicia are provided by partially demetallizing a metallised coating on one or both sides of the first layer.

11. A security element as claimed in claim 1 in which at least one optically variable device comprises an image formed from optically variable ink.

12. A security element as claimed in claim 1 in which at least one optically variable device is provided by a demetalized hologram.

13. A security material for use in the manufacture of security articles comprising opposed surfaces suitable for printing to identify an article formed from the material, and at least partially exposed on at least one surface of the material is a security element as claimed in any one of the proceeding claims to provide a security feature.

14. A security material as claimed in claim 13 in which the security element is applied to one or both surfaces of the material.

15. A security material as claimed in claim 13 in which the security element is at least partially embedded in the material between the opposed surfaces thereof and portions of the security element are exposed in windows in one or both surfaces.

16. A security material as claimed in claim 13 in which the security element is in the form of an elongate strip or thread.

17. A security material as claimed in claim 13 in which the security element is applied in the form of a patch or other discrete region.

18. A security element as claimed in claim 2 further comprising a second layer adhered to the thermochromic coating and having at least one further optically variable device applied to the surface thereof.

19. A security element as claimed in claim 2 further comprising a protective layer over the optically variable device or devices.

20. A security element as claimed in claim 2 in which the thermochromic coating is composed of a variety of thermochromic compounds which display differing colours, which compounds are activated at different temperatures, such that, as the element is warmed or subsequently cooled, it progresses through a pattern of changing colours.

21. A security element as claimed in claim 2 further including a fluorescent dye or material either in the first layer, on the surface of the first layer or in a coating on the surface of the first layer.

22. A security element as claimed in claim 2 in which the indicia incorporates a fluorescent dye or material.

23. A security element as claimed in claim 2 in which the indicia are printed using a coloured ink.

24. A security element as claimed in claim 2 in which the indicia are printed using a magnetic ink.

25. A security element as claimed in claim 2 in which the indicia are provided by partially demetallizing a metallised coating on one or both sides of the first layer.

26. A security element as claimed in claim 2 in which at least one optically variable device comprises an image formed from optically variable ink.

27. A security element as claimed in claim 2 in which at least one optically variable device is provided by a demetalized hologram.

* * * * *